(12) United States Patent
Ma et al.

(10) Patent No.: US 10,580,214 B2
(45) Date of Patent: Mar. 3, 2020

(54) IMAGING DEVICE AND IMAGING METHOD FOR AUGMENTED REALITY APPARATUS

(71) Applicant: BOE TECHNOLOGY GROUP CO., LTD., Beijing (CN)

(72) Inventors: Xitong Ma, Beijing (CN); Naifu Wu, Beijing (CN); Dianmeng Li, Beijing (CN); Rui Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/934,215

(22) Filed: Mar. 23, 2018

(65) Prior Publication Data
US 2019/0102945 A1 Apr. 4, 2019

(30) Foreign Application Priority Data
Sep. 29, 2017 (CN) .......................... 2017 1 0907251

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ...... H04W 8/005; H04W 8/24; G02B 27/017; G02B 2027/0178; H04N 21/44016; H04N 21/4788; H04N 21/6125; H04N 21/816; H04N 21/8358; H04N 21/44008; H04N 21/8146; H04N 5/265; H04N 21/4722; H04N 21/4316; H04N 1/448; G06T 19/006; G06T 7/70; G06T 15/20; G06F 2200/1637; G06F 3/0346; G06F 3/1423; G06F 21/00; G06F 2221/032; G09G 2358/00;
(Continued)

(56) References Cited

U.S. PATENT DOCUMENTS 9,998,790 B1 * 6/2018 Logan ................ H04N 21/4668
2009/0197649 A1 * 8/2009 Ranney ............... H04M 1/0258
455/569.1
(Continued)

FOREIGN PATENT DOCUMENTS

CN 104881128 A 9/2015
CN 104951080 A 9/2015
(Continued)

OTHER PUBLICATIONS

First Office Action for Chinese Application No. 201710907251.1, dated Nov. 2, 2018, 10 Pages.

*Primary Examiner* — Jin Cheng Wang
(74) *Attorney, Agent, or Firm* — Brooks Kushman P.C.

(57) ABSTRACT

The present disclosure provides in some embodiments an imaging device and an imaging method for an AR apparatus. The imaging method includes steps of: achieving, by the AR apparatus, to be in communication with a terminal device; receiving, by the AR apparatus, image data from the terminal device; and displaying, by the AR apparatus, the image data.

16 Claims, 6 Drawing Sheets

(51) Int. Cl.
*H04N 13/106* (2018.01)
*H04N 13/239* (2018.01)
*H04N 13/128* (2018.01)

(52) U.S. Cl.
CPC ......... *H04N 13/106* (2018.05); *H04N 13/128* (2018.05); *H04N 13/239* (2018.05); *G02B 2027/0134* (2013.01); *G02B 2027/0138* (2013.01); *G02B 2027/0178* (2013.01)

(58) Field of Classification Search
CPC ........... G09G 5/003; G06K 2009/4666; G06K 9/00671; G06K 9/46; H04M 1/7253
See application file for complete search history.

(56) References Cited

U.S. PATENT DOCUMENTS

| | | | | |
|---|---|---|---|---|
| 2009/0239470 | A1* | 9/2009 | Sherman | H04W 76/10 455/41.2 |
| 2012/0105447 | A1* | 5/2012 | Kim | H04N 21/42226 345/419 |
| 2013/0021373 | A1* | 1/2013 | Vaught | G02B 27/017 345/633 |
| 2013/0204939 | A1* | 8/2013 | Yajima | H04W 4/21 709/204 |
| 2014/0317659 | A1* | 10/2014 | Yasutake | H04N 21/42209 725/43 |
| 2014/0375691 | A1* | 12/2014 | Kasahara | G06T 11/60 345/633 |
| 2015/0015459 | A1* | 1/2015 | Cho | G02B 27/017 345/8 |
| 2015/0070390 | A1* | 3/2015 | Kasahara | G06K 9/00671 345/633 |
| 2015/0145889 | A1* | 5/2015 | Hanai | H04N 5/2621 345/633 |
| 2015/0206350 | A1* | 7/2015 | Gardes | G06T 7/70 345/619 |
| 2015/0348322 | A1* | 12/2015 | Ligameri | G02B 27/017 345/633 |
| 2016/0054567 | A1* | 2/2016 | Kim | G02B 27/0172 345/8 |
| 2016/0147492 | A1* | 5/2016 | Fugate | G06F 3/1423 345/633 |
| 2016/0314620 | A1* | 10/2016 | Reilly | G09G 5/18 |
| 2017/0010849 | A1 | 1/2017 | Deng et al. | |
| 2017/0061700 | A1 | 3/2017 | Urbach et al. | |
| 2017/0104766 | A1* | 4/2017 | Bhardwaj | H04L 63/126 |
| 2017/0201808 | A1* | 7/2017 | Chowdhary | H04N 21/816 |
| 2017/0236302 | A1* | 8/2017 | Arth | G06T 7/74 382/103 |
| 2018/0365760 | A1* | 12/2018 | Faris | G06Q 30/0643 |

FOREIGN PATENT DOCUMENTS

| | | |
|---|---|---|
| CN | 105607263 A | 5/2016 |
| CN | 107209565 A | 9/2017 |
| CN | 107250891 A | 10/2017 |

* cited by examiner

IMAGING DEVICE AND IMAGING METHOD FOR AUGMENTED REALITY APPARATUS

CROSS-REFERENCE TO RELATED APPLICATION

This application claims priority to Chinese Patent Application No. 201710907251.1 filed on Sep. 29, 2017, which is incorporated herein by reference in its entirety.

TECHNICAL FIELD

The present disclosure relates to the manufacture of an intelligent device, in particular to an imaging device and an imaging method for an Augmented Reality (AR) apparatus.

BACKGROUND

Recently, there are more and more types of terminal devices each with an electronic display screen, e.g., desktop computers, lap-top computers, mobile phones and e-book readers. Usually, these terminal devices are used in some public places, e.g., Internet bars, subways or buses. In the case that some contents displayed on these terminal devices need to be kept confidential, it is necessary to prevent these contents from being viewed by any other person at the side.

SUMMARY

In one aspect, the present disclosure provides in some embodiments an image method for an AR apparatus, including steps of: achieving, by the AR apparatus, to be in communication with a terminal device; receiving, by the AR apparatus, image data from the terminal device; and displaying, by the AR apparatus, the image data.

In a possible embodiment of the present disclosure, prior to the step of displaying, by the AR apparatus, the image data, the imaging method further includes determining, by the AR apparatus, whether or not the terminal device has been unlocked. The step of displaying, by the AR apparatus, the image data includes, in the case that the terminal device has been unlocked, displaying, by the AR device, the image data.

In a possible embodiment of the present disclosure, the step of determining, by the AR apparatus, whether or not the terminal device has been unlocked includes: capturing, by the AR apparatus, a first image containing a current image displayed on the terminal device; comparing, by the AR apparatus, the first image with a pre-stored target image; and in the case that the first image matches the target image, determining, by the AR apparatus, that the terminal device has been unlocked. The target image contains an image displayed on the terminal device during or after an unlocking operation.

In a possible embodiment of the present disclosure, the step of displaying, by the AR apparatus, the image data includes displaying, by the AR apparatus, the image data in accordance with a distance between the AR apparatus and the terminal device and a size of an imaging region of the terminal device, so as to display the image data at the imaging region of the terminal device. The imaging region of the terminal device is located within a contour of the terminal device.

In a possible embodiment of the present disclosure, the step of displaying, by the AR apparatus, the image data in accordance with the distance between the AR apparatus and the terminal device and the size of the imaging region of the terminal device includes: scaling, by the AR apparatus, the image data in accordance with a proportion of a size of an image currently configured by the AR apparatus to the size of the imaging region of the terminal device; adjusting, by the AR apparatus, an imaging distance of the AR apparatus in accordance with the distance between the AR apparatus and the terminal device; and displaying, by the AR apparatus, the resultant image data.

In a possible embodiment of the present disclosure, prior to the step of scaling, by the AR apparatus, the image data, the imaging method further includes: acquiring, by the AR apparatus, two second images of the terminal device from different perspectives; determining, by the AR apparatus, vertex coordinates of the imaging region on each of the two second images; subjecting, by the AR apparatus, the vertex coordinates to treatment on the basis of a disparity principle, so as to acquire contour coordinates of the imaging region; and acquiring, by the AR apparatus, a length and a width of the imaging region in accordance with the contour coordinates.

In a possible embodiment of the present disclosure, the step of adjusting, by the AR apparatus, the imaging distance of the AR apparatus in accordance with the distance between the AR apparatus and the terminal device includes: subjecting, by the AR apparatus, the acquired image data to treatment so as to acquire a left-eye image and a right-eye image, and adjusting a pixel offset of the left-eye image displayed on a left-eye lens of the AR apparatus and/or a pixel offset of the right-eye image displayed on a right-eye lens of the AR apparatus in accordance with the distance between the AR apparatus and the terminal device; or adjusting, by the AR apparatus, a distance between each of the left-eye lens and the right-eye lens and a corresponding objective lens of the AR apparatus.

In a possible embodiment of the present disclosure, the step of determining, by the AR apparatus, whether or not the terminal device has been unlocked precedes the step of enabling the AR apparatus to be in communication with the terminal device.

In a possible embodiment of the present disclosure, the step of determining, by the AR apparatus, whether or not the terminal device has been unlocked follows the step of enabling the AR apparatus to be in communication with the terminal device and precedes the step of receiving, by the AR apparatus, the image data from the terminal device.

In another aspect, the present disclosure provides in some embodiments an imaging method for an AR apparatus, including steps of: achieving, by a terminal device, to be in communication with the AR apparatus; and transmitting, by the terminal device, image data containing a to-be-displayed image generated during the operation of the terminal device to the AR apparatus, and disenabling a display function of the terminal device.

In yet another aspect, the present disclosure provides in some embodiments an AR apparatus, including: a communication circuit configured to be in communication with a terminal device and receive image data from the terminal device; and a display circuit configured to display the image data.

In a possible embodiment of the present disclosure, the AR apparatus further includes: an image capturing circuit configured to capture a first image containing a current image displayed on the terminal device; a storage circuit configured to store therein a target image containing an image displayed on the terminal device during or after an unlocking operation; and a processing circuit configured to determine whether or not the first image matches the target image.

In a possible embodiment of the present disclosure, the storage circuit is configured to store therein the target image containing the image displayed on the terminal device during or after the unlocking operation, and the first image matching the target image.

In a possible embodiment of the present disclosure, the processing circuit is further configured to scale the image data in accordance with a proportion of a size of an image currently configured by the AR apparatus to the size of the imaging region of the terminal device, and adjust an imaging distance of the AR apparatus in accordance with a distance between the AR apparatus and the terminal device.

In a possible embodiment of the present disclosure, the image capturing circuit includes two cameras.

In a possible embodiment of the present disclosure, the image capturing circuit includes one camera.

In still yet another aspect, the present disclosure provides in some embodiments a terminal device, including a memory, a processor and a transceiver connected to each other via a bus. The processor is configured to execute a program stored in the memory, so as to implement the above-mentioned imaging method for the AR apparatus.

In still yet another aspect, the present disclosure provides in some embodiments a non-transient computer-readable storage medium storing therein an instruction, which is operated on an AR apparatus, so as to enable the AR apparatus to implement the above-mentioned imaging method for the AR apparatus, or which is operated on a terminal device, so as to enable the terminal device to implement the above-mentioned imaging method for the AR apparatus.

In still yet another aspect, the present disclosure provides in some embodiments a computer program product including an instruction. The computer program product is operated on an AR apparatus, so as to enable the AR apparatus to implement the above-mentioned imaging method for the AR apparatus, or the computer program product is operated on a terminal device, so as to enable the terminal device to implement the above-mentioned imaging method for the AR apparatus.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "first" and "second" used in the specification and claims are merely used to differentiate different components rather than to represent any order, number or importance. Hence, in the case any feature is defined by "first" or "second", it may explicitly or implicitly mean that one or more features are included.

First Embodiment

Figure 1:
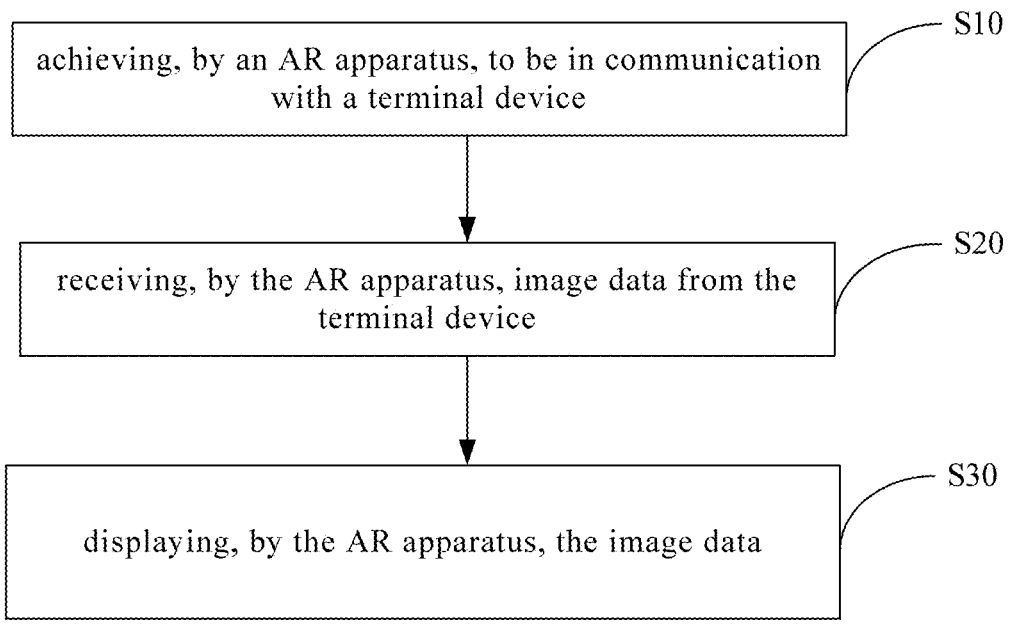
FIG. 1 is a flow chart of an imaging method for an AR apparatus according to one embodiment of the present disclosure.

The present disclosure provides in this embodiment an imaging method for an AR apparatus. The imaging method may be implemented by the AR apparatus, e.g., hardware of the AR apparatus and/or software run on the AR apparatus. Correspondingly, the AR apparatus mentioned hereinafter may not only refer to the entire AR apparatus, but also to all of or part of the hardware of the AR apparatus and/or the software run on the AR apparatus. As shown in FIG. 1, the imaging method may include the following Steps S10 to S30, for example.

Step S10: achieving, by the AR apparatus, to be in communication with a terminal device. Here, the AR apparatus may communicate with the terminal device in a wired or wireless manner.

In the case that the AR apparatus communicates with the terminal device in a wired manner, the AR apparatus and the terminal device may be each provided with a data transmission interface, e.g., at least one of a Universal Serial Bus (USB) interface, a mini-USB interface, and a lightning interface. The USB interface and the mini-USB interface may be applicable to the terminal device installed with an Android system, while the lightning interface may be applicable to the terminal device installed with an iOS or Mac OS system. Correspondingly, the AR apparatus may be provided with any one or more of the above-mentioned data transmission interfaces. In the case that the AR apparatus communicates with the terminal device in a wireless manner, the AR apparatus and the terminal device may be each provided with a Bluetooth module or a Wireless-Fidelity (WiFi) module. In a possible embodiment of the present disclosure, the AR apparatus is mainly configured to receive data, so it may be provided with a data reception function rather than a data transmission function, regardless of the type of the communication with the terminal device. At this time, the AR apparatus may be provided with a WiFi reception module. Of course, the AR apparatus may also be provided with both the data reception function and the data transmission function, which will not be particularly defined herein.

The terminal device may include any type of terminal device, e.g., a mobile phone, a wearable device, a flat-panel computer, a lap-top computer, an Ultra Mobile Personal Computer (UMPC), a netbook, or a Personal Digital Assistant (PDA), which will not be particularly defined herein.

In addition, the AR apparatus may include monocular glasses or binocular glasses.

Step S20: receiving, by the AR apparatus, image data from the terminal device. In other words, the terminal device may generate the image data in accordance with a to-be-displayed image (i.e., an image that should have been displayed on a display screen of the terminal device), and transmit the generated image data to the AR apparatus.

Step S30: displaying, by the AR apparatus, the image data.

In a possible embodiment of the present disclosure, an imaging distance of the AR apparatus (e.g., the AR glasses) may be adjusted to be equal to a distance between the AR apparatus and the terminal device (a thickness of the terminal device may be omitted). At this time, a plane where the terminal device is located may serve as an image plane of the AR apparatus. In the case that the AR apparatus is used by a user, the image data is just displayed on the terminal device.

According to the imaging method in this embodiment of the present disclosure, the to-be-displayed image of the terminal device is projected by the AR apparatus to a display surface of the terminal device, so as to merely enable the user wearing the AR apparatus to view the image displayed on the display surface of the terminal device, and prevent any other person from viewing the image. As a result, it is able to display the image in a private manner.

Figure 2:
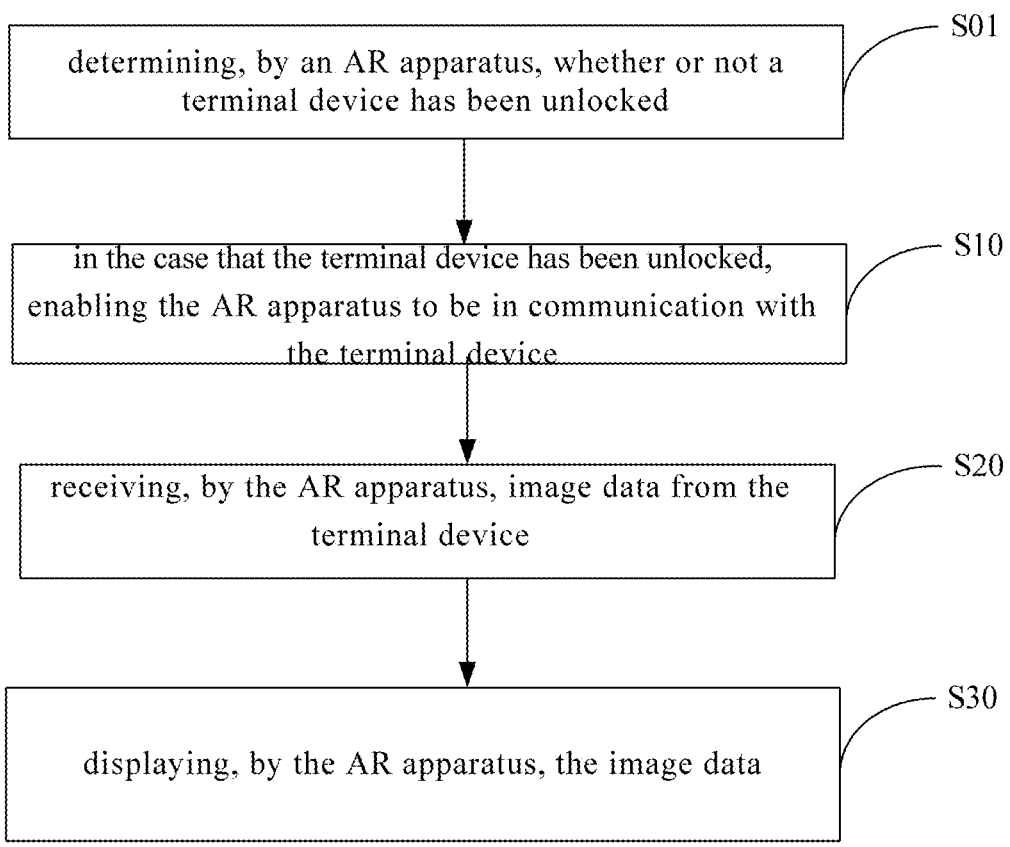
FIG. 2 is another flow chart of the imaging method for the AR apparatus according to one embodiment of the present disclosure.
Figure 3:
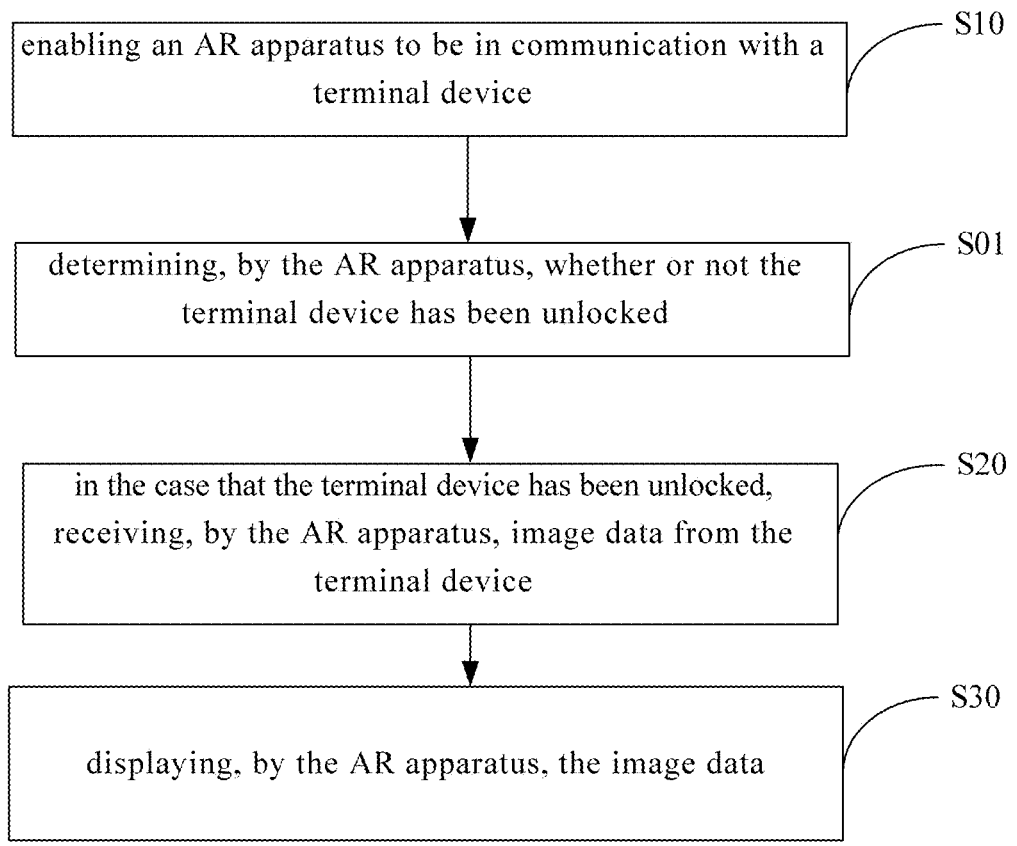
FIG. 3 is yet another flow chart of the imaging method for the AR apparatus according to one embodiment of the present disclosure.

In a possible embodiment of the present disclosure, as shown in FIG. 2 and FIG. 3, the imaging method may further include the following steps.

Step S01: determining, by the AR apparatus, whether or not the terminal device has been unlocked. Depending on different ways for determining whether or not the terminal device has been unlocked, Step S01 may precede Step S20 or Step S10, but it must precede Step S30. In other words, the AR apparatus may display the image data merely in the case that the terminal device has been unlocked.

In a possible embodiment of the present disclosure, in the case that the AR apparatus determines whether or not the terminal device has been unlocked through capturing and analyzing the image currently displayed on the display device, Step S01 may precede Step S10. At this time, the AR apparatus may be in communication with the terminal device merely in the case that the terminal device has been unlocked. In another possible embodiment of the present disclosure, in the case that the AR apparatus determines whether or not the terminal device has been unlocked through determining whether or not an unlocking signal is transmitted from the terminal device to the AR apparatus, Step S01 may precede Step S20. At this time, the AR apparatus may receive the image data from the terminal device merely in the case that the terminal device has been unlocked. In a word, the AR apparatus may display the image data merely in the case that the terminal device has been unlocked.

Here, the AR apparatus may project the image data after the terminal device has been unlocked, so as to prevent an undesired image from being projected by the AR apparatus, thereby to reduce a burden of the AR apparatus.

In a possible embodiment of the present disclosure, Step S01 may include: capturing, by the AR apparatus, a first image containing a current image displayed on the terminal device; comparing, by the AR apparatus, the first image with the pre-stored target image; and in the case that the first image matches the target image, determining, by the AR apparatus, that the terminal device has been unlocked. The target image contains the image displayed on the terminal device during or after an unlocking operation.

Here, in actual use, the AR apparatus may perform a capturing operation for one time so as to acquire the first image matching the target image. Of course, the AR apparatus may perform the capturing operation for more than one times, so as to acquire the first image matching the target image. In addition, the first image may be captured in real time in accordance with the user's requirements.

Figure 4A:
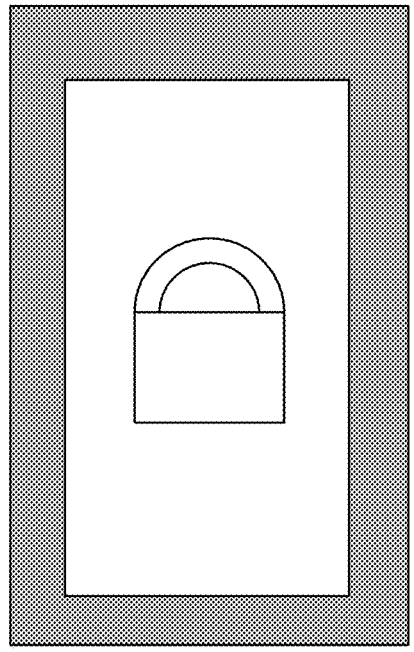
FIG. 4A is a schematic view showing an image containing an image currently displayed on a terminal device according to one embodiment of the present disclosure.
Figure 4B:
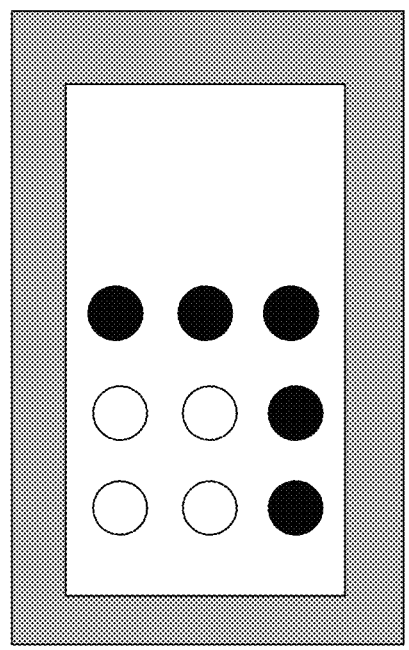
FIG. 4B is another schematic view showing an image containing an image currently displayed on the terminal device according to one embodiment of the present disclosure.
Figure 4C:
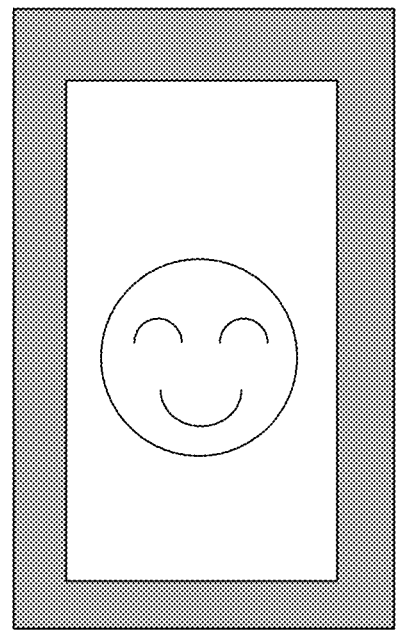
FIG. 4C is yet another schematic view showing an image containing an image currently displayed on the terminal device according to one embodiment of the present disclosure.

In a possible embodiment of the present disclosure, the terminal device may be unlocked via a gesture. FIG. 4A shows an image acquired in the case that the terminal device has not yet been unlocked. FIG. 4B shows an image acquired during the unlocking operation of the terminal device. And FIG. 4C shows an image acquired after the unlocking operation of the terminal device. The target image may be the image shown in FIG. 4B or FIG. 4C.

It should be appreciated that, the first image and the target image may each be an image containing the current image, i.e., an image containing the image currently displayed on the display screen. A pattern at a non-display region (e.g., grey regions in FIG. 4A, FIG. 4B and FIG. 4C) will not be particularly defined, so as to meet the user's requirements on decorations at the non-display region of the terminal device.

In a possible embodiment of the present disclosure, Step S30 may include displaying, by the AR apparatus, the image data in accordance with a distance between the AR apparatus and the terminal device and a size of an imaging region of the terminal device, so as to display the image data at the imaging region of the terminal device. The imaging region of the terminal device may be located within a contour of the terminal device.

Here, in the case that a line of sight of the user wearing the AR apparatus is directed toward the terminal device, the AR apparatus may display the image data at the imaging region of the terminal device. In the case that the line of sight of the user wearing the AR apparatus is directed toward any other direction, the AR apparatus may display the image data at a region related to the direction of the line of sight of the user.

The distance between the AR apparatus and the terminal device may be, but not limited to, a distance between a center of the AR apparatus and a center of the terminal device.

In the case that the imaging region of the terminal device is within the contour of the terminal device, it may just cover the entire terminal device, or cover a display region of the terminal device, i.e., a region where the display screen of the display device is located.

Further, the step of displaying, by the AR apparatus, the image data in accordance with the distance between the AR apparatus and the terminal device and the size of the imaging region of the terminal device may include scaling, by the AR apparatus, the image data in accordance with a proportion of a size of an image currently configured by the AR apparatus to the size of the imaging region of the terminal device.

In a possible embodiment of the present disclosure, the image currently configured by the AR apparatus has a size of M*N (length*width), and the imaging region of the terminal device has a size of A*B (length*width). An imaging system of the AR apparatus may perform a down scalar operation on the image data in accordance with a contour of the imaging region of the terminal device at a lateral scalar ratio of M/A and a vertical scalar ratio of N/B.

Here, the imaging region of the terminal device may cover the entire terminal device, or cover merely a display region of the terminal device (i.e., a portion of the terminal device in FIG. 4A, FIG. 4B and FIG. 4C other than the grey regions). The AR apparatus may adjust its imaging distance in accordance with the distance between the AR apparatus and the terminal device. In other words, after the adjustment of the imaging distance of the AR apparatus, the image data may be just projected onto the imaging region of the terminal device.

Figure 5:
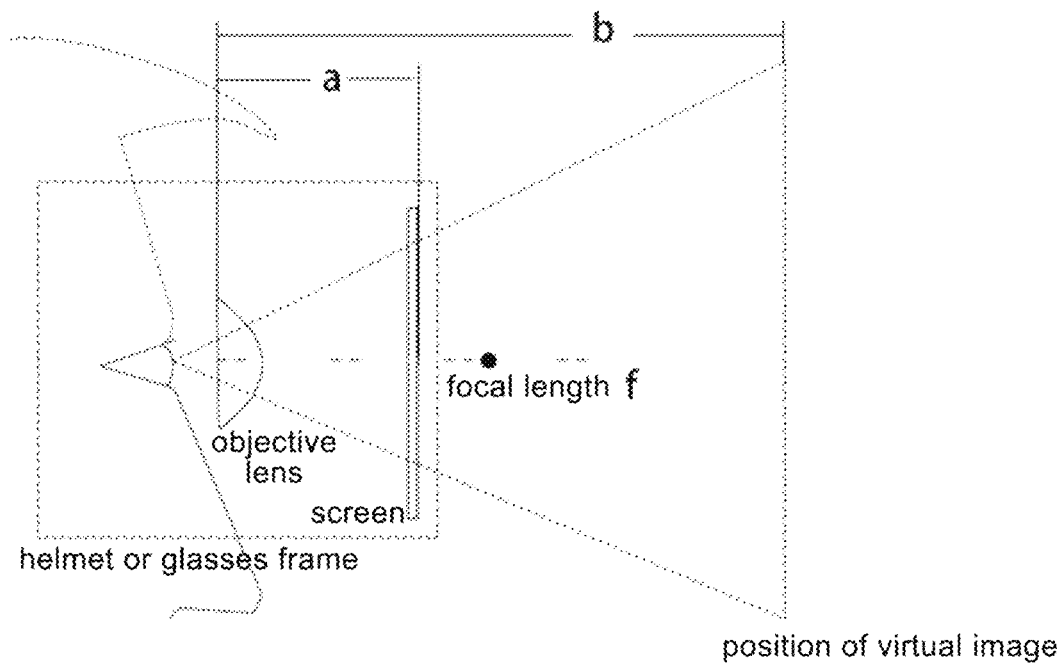
FIG. 5 is a schematic view showing a principle of two-dimensional (2D) display.

In a possible embodiment of the present disclosure, for 2D display, as shown in FIG. 5, the imaging distance b of the AR apparatus may be calculated using the equation: b=−1/(1/f−1/a), where "a" represents a distance between a screen and an objective lens of the AR apparatus, "b" represents the imaging distance of the AR apparatus (i.e., a distance between a virtual image and the lens of the AR apparatus), and "f" represents a focal length of the objective lens. Hence, it is able to adjust the imaging distance of the AR apparatus through adjusting the distance "a" between the screen and the lens of the AR apparatus. The screen is just a left-eye or right-eye lens of the AR apparatus.

Figure 6:
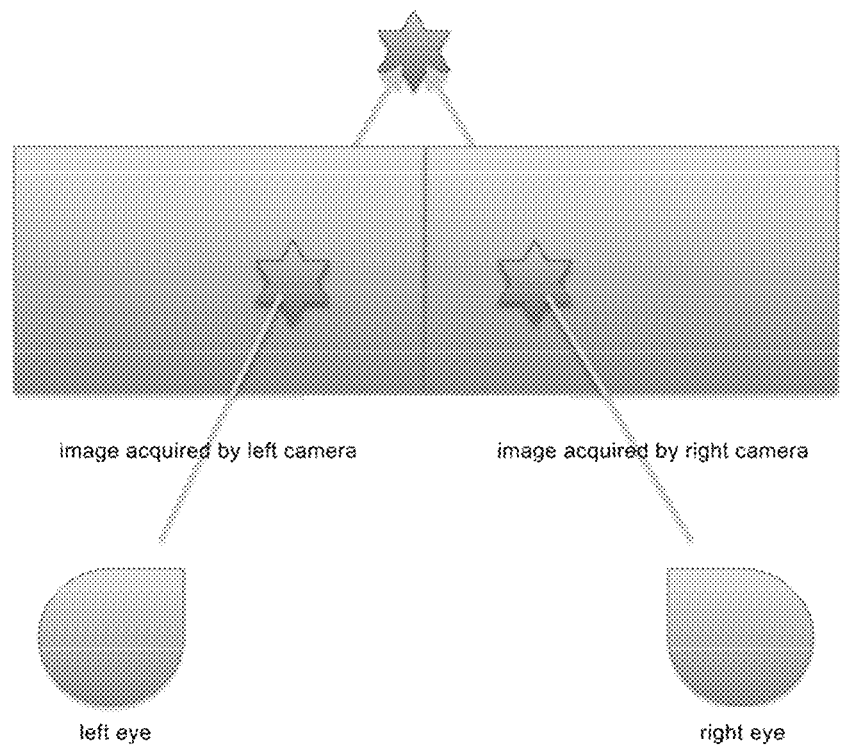
FIG. 6 is a schematic view showing a principle of three-dimensional (3D) display.

In a possible embodiment of the present disclosure, for 3D display, as shown in FIG. 6, the imaging distance of the AR apparatus may be adjusted through adjusting pixel positions in a left-eye image and a right-eye image acquired through the left-eye lens and the right-eye lens. The AR apparatus may display the resultant image data.

The step of scaling the image data and the step of adjusting the imaging distance of the AR apparatus may be performed in any sequence, i.e., they may be performed simultaneously, or one after another.

Further, prior to the step of scaling the image data, the imaging method may further include: acquiring, by the AR apparatus, two second images of the terminal device from different perspectives; determining, by the AR apparatus, vertex coordinates of the imaging region on each of the two second images; subjecting, by the AR apparatus, the vertex coordinates to treatment on the basis of a disparity principle, so as to acquire contour coordinates of the imaging region; and acquiring, by the AR apparatus, a length and a width of the imaging region in accordance with the contour coordinates.

To be specific, in the case that the imaging region is the entire display surface of the terminal device, the AR apparatus may acquire two second images of the terminal device from different perspectives. Here, the two second images may be acquired merely in the case that it is necessary to calculate the length and width of the imaging region. In a possible embodiment of the present disclosure, after the first image matches the target image, two sub-images for forming the first image may be stored as the two second images.

Next, the AR apparatus may determine vertex coordinates of the imaging region on each of the two second images. For example, the imaging region may be of a rectangular shape, and there may be four sets of vertex coordinates.

Next, the AR apparatus may subject the vertex coordinates to treatment on the basis of a disparity principle, so as to acquire contour coordinates of the imaging region.

Figure 7:
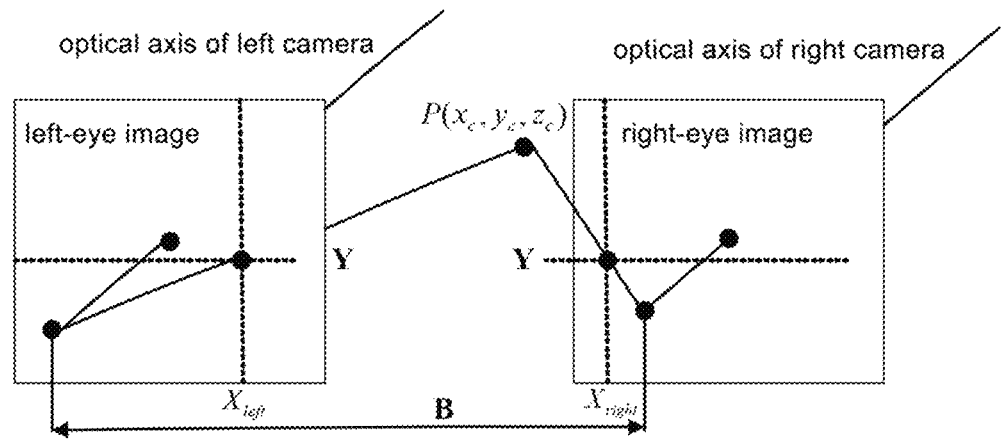
FIG. 7 is a schematic view showing a principle of binocular vision according to one embodiment of the present disclosure.

By taking one vertex as an example, two second images may be acquired through a camera from two different perspectives. In a possible embodiment of the present disclosure, as shown in FIG. 7, the two second images may also be acquired through two cameras. For a vertex $P(x_c, y_c, z_c)$ of the imaging region, its coordinates on a left image is $p_{left}=(X_{left}, Y_{left})$, while its coordinates on a right image is $p_{right}=(X_{right}, Y_{right})$.

The two second images are acquired by the two cameras in an identical plane, so the vertex P has an identical Y-axis coordinate on the two images, i.e., $Y_{left}=Y_{right}=Y$. On the basis of a triangular geometrical relationship, the following equations may be acquired:

$$\begin{cases} X_{left} = f\dfrac{x_c}{z_c} \\ X_{right} = f\dfrac{(x_c - B)}{z_c}, \\ Y = f\dfrac{y_c}{z_c} \end{cases}$$

where B represents a length of a line connecting projection centers of the two cameras, and f represents a focal length of each camera.

The disparity may be calculated using the following equation: $Disparity=X_{left}-X_{right}$. At this time, 3D coordinates of the vertex P in a camera-based coordinate system may be calculated using the following equations:

$$\begin{cases} x_c = \dfrac{B * X_{left}}{Disparity} \\ y_c = \dfrac{B * Y}{Disparity}. \\ z_c = \dfrac{B * f}{Disparity} \end{cases}$$

The coordinates of each of the four vertices of the image region may be determined as mentioned.

Next, the AR apparatus may acquire a length and a width of the imaging region in accordance with the contour coordinates, i.e., calculate a distance between the corresponding vertices of the imaging regions.

Figure 8:
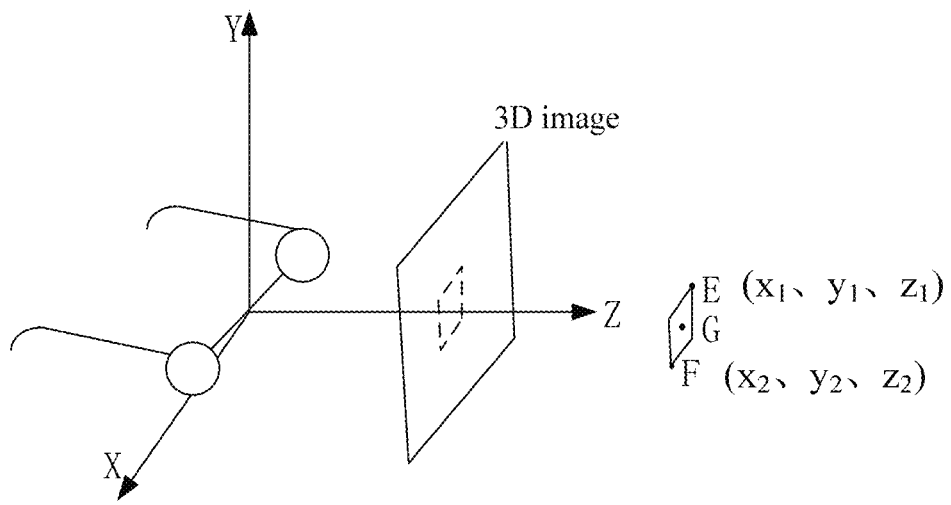
FIG. 8 is a schematic view showing a position relationship between the AR apparatus and the terminal device according to one embodiment of the present disclosure.

In the case that the terminal device is arranged parallel to the AR apparatus, a distance between the center of the terminal device and the center of the AR apparatus is just a value $|z_c|$ of the contour coordinates of the display surface of the terminal device in a Z-axis direction. In the case that the terminal device is not arranged parallel to the AR apparatus, as shown in FIG. 8, coordinates of the center of the AR apparatus may be set as (0, 0, 0), and coordinates of a center point G of the display surface of the terminal device may be $$\left(\frac{1}{2}(x_1+x_2),\ \frac{1}{2}(y_1+y_2),\ \frac{1}{2}(z_1+z_2)\right),$$

i.e., the distance between the center G of the display surface of the terminal device and the center of the AR apparatus may be $$\sqrt{\left[\left[\frac{1}{2}(x_1+x_2)-0\right]^2+\left[\frac{1}{2}(y_1+y_2)-0\right]^2+\left[\frac{1}{2}(z_1+z_2)-0\right]^2\right]}.$$

Coordinates of a point E on the contour of the display surface of the terminal device is (x1, y1, z1), and coordinates of a point F on the contour of the display surface of the terminal device is (x2, y2, z2). Both the points E and F are two vertices of the contour of the terminal device at two diagonal positions.

Further, the step of adjusting, by the AR apparatus, the imaging distance of the AR apparatus in accordance with the distance between the AR apparatus and the terminal device may include: for the 3D display, subjecting, by the AR apparatus, the acquired image data to treatment so as to acquire a left-eye image and a right-eye image, and adjusting a pixel offset of the left-eye image displayed on a left-eye lens of the AR apparatus and/or a pixel offset of the right-eye image displayed on a right-eye lens of the AR apparatus in accordance with the distance between the AR apparatus and the terminal device.

In other words, a depth of field of a 3D image is adjusted through adjusting the pixel offset. For the left-eye and right-eye data of the 3D image, each left-eye pixel moves to the right while each right-eye pixel moves to the left, and the other pixels are turned off so as to not emit light. At this time, the depth of field of the 3D image may decrease. In addition, for the left-eye and right-eye data of the 3D image, each left-eye pixel moves to the left while each right-eye pixel moves to the right, and the other pixels are turned off so as to not emit light. At this time, the depth of field of the 3D image may increase. There is a one-to-one correspondence between the depth of field and the pixel offset. The pixel offsets and the distances between the terminal device and the AR apparatus (i.e., actual imaging distances) may be measured in advance to form a table, and then the pixel offset may be acquired from the table in accordance with the distance between the terminal device and the AR apparatus.

For the 2D display, as shown in FIG. 5, the AR apparatus may adjust a distance between each of the left-eye lens and the right-eye lens and a corresponding objective lens of the AR apparatus.

Second Embodiment

Figure 9:
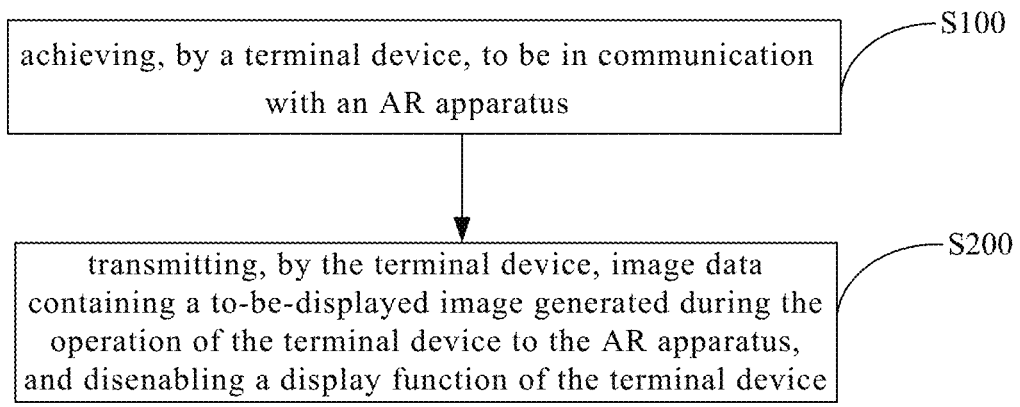
FIG. 9 is a flow chart of an imaging method for an AR apparatus according to one embodiment of the present disclosure.

The present disclosure further provides in this embodiment an imaging method for an AR apparatus. The imaging method may be implemented by a terminal device, e.g., hardware of the terminal device and/or software run on the terminal device. Correspondingly, the terminal device mentioned hereinafter may not only refer to the entire terminal device, but also to the hardware of the terminal device and/or the software run on the terminal device. As shown in FIG. 9, the imaging method may include: Step S100 of achieving, by a terminal device, to be in communication with the AR apparatus; and Step S200 of transmitting, by the terminal device, image data containing a to-be-displayed image generated during the operation of the terminal device to the AR apparatus, and disenabling a display function of the terminal device.

To be specific, a backlight source of the terminal device may be turned off, so as to disenable the display function of the terminal device. At this time, the terminal device may operate normally, but may not display the image. Of course, the transmitted image data may be updated in real time.

In a possible embodiment of the present disclosure, an interaction between the AR apparatus and the terminal device will be described hereinafter. The AR apparatus may determine whether or not the terminal device has been unlocked. In the case that the terminal device has been unlocked, the AR apparatus may be in communication with the terminal device. The terminal device may generate the image data containing the to-be-displayed image generated during the operation of the terminal device, and transmit the image data to the AR apparatus. Upon the receipt of the image data from the terminal device, the AR apparatus may scale the image data in accordance with the proportion of the size of the image currently configured by the AR apparatus to the size of the imaging region of the terminal device, and then adjust the imaging distance of the AR apparatus in accordance with the distance between the AR apparatus and the terminal device. Finally, the AR apparatus may display the resultant image data.

At this time, no image data is displayed on the terminal device, so it is merely able for the user wearing the AR apparatus to view the image currently displayed on the terminal device.

Third Embodiment

Figure 10:
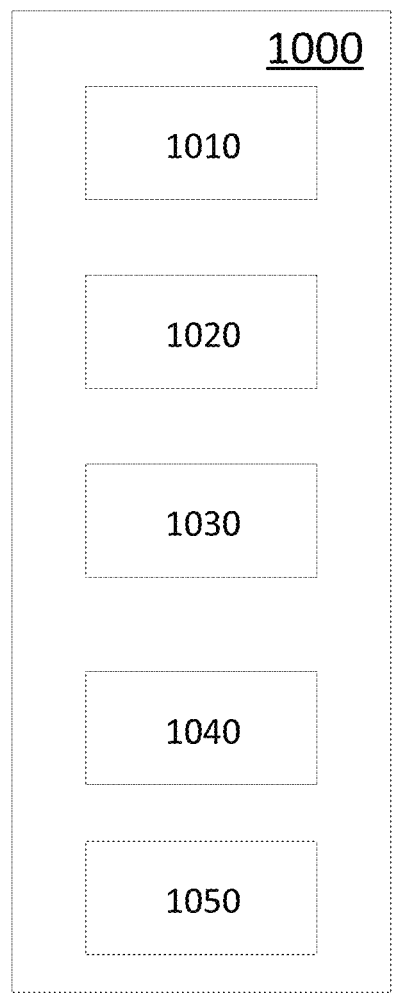
FIG. 10 is a block diagram of an AR apparatus 1000 according to one embodiment of the present disclosure.
Figure 11:
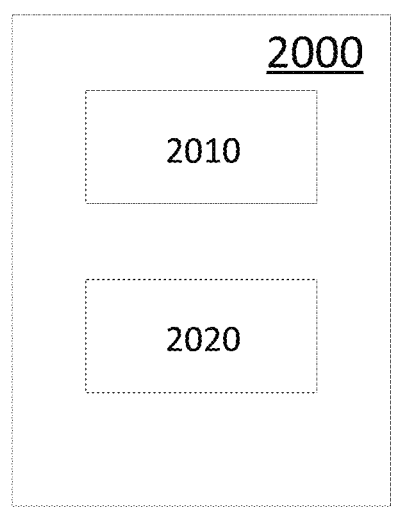
FIG. 11 is a block diagram of a terminal device 2000 according to one embodiment of the present disclosure.

As shown in FIG. 10, the present disclosure further provides in this embodiment an AR apparatus 1000, which includes: a communication circuit 1010 configured to be in communication with a terminal device and receive image data from the terminal device; and a display circuit 1020 configured to display the image data.

In the case that the AR apparatus is a pair of AR glasses, it may further include a glass body.

In a possible embodiment of the present disclosure, in the case that the AR apparatus needs to determine whether or not the terminal device has been unlocked, the AR apparatus may further include: an image capturing circuit 1030 configured to capture a first image containing a current image displayed on the terminal device; a storage circuit 1040 configured to store therein a target image containing an image displayed on the terminal device during or after an unlocking operation; and a processing circuit 1050 configured to determine whether or not the first image matches the target image.

In a possible embodiment of the present disclosure, the storage circuit is further configured to store the first image matching the target image. In other words, in the case that the first image matches the target image, the first image may be stored.

In a possible embodiment of the present disclosure, the processing circuit is further configured to scale the image data in accordance with a proportion of a size of an image currently configured by the AR apparatus to the size of the imaging region of the terminal device, and adjust an imaging distance of the AR apparatus in accordance with a distance between the AR apparatus and the terminal device.

In order to acquire a more accurate measurement result of contour coordinates of a display surface of the terminal device, in a possible embodiment of the present disclosure, the image capturing circuit may include two cameras.

Fourth Embodiment

The present disclosure further provides in this embodiment a terminal device 2000, which includes: a processing circuit 2010 configured to generate image data containing a to-be-displayed image generated during the operation of the terminal device; and a communication circuit 2020 configured to enable the terminal device to be in communication with an AR apparatus and transmit the image data to the AR apparatus.

In addition, the image data may be converted into data in a format capable of being transmitted through the communication circuit in accordance with the practical need.

Fifth Embodiment

The present disclosure further provides in this embodiment a computer-readable storage medium storing therein an instruction, which is operated on an AR apparatus, so as to enable the AR apparatus to implement the above-mentioned imaging method for the AR apparatus, or which is operated on a terminal device, so as to enable the terminal device to implement the above-mentioned imaging method for the AR apparatus.

The computer-readable storage medium may be an optical disk storing therein the instruction.

The present disclosure further provides in this embodiment a computer program product including an instruction. The computer program product is operated on an AR apparatus, so as to enable the AR apparatus to implement the above-mentioned imaging method for the AR apparatus, or the computer program product is operated on a terminal device, so as to enable the terminal device to implement the above-mentioned imaging method for the AR apparatus.

The computer program product including the instruction may be software capable of being installed on the terminal device.

It should be appreciated that, all or parts of the above-mentioned steps may be implemented via hardware related to programs or instructions. The above-mentioned program may be stored in a computer-readable storage medium, and it may be executed, so as to implement the above-mentioned steps. The storage medium may include any medium capable of storing therein program codes, such as Read Only Memory (ROM), Random Access Memory (RAM), magnetic disk or optical disk.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An imaging method for an Augmented Reality (AR) apparatus, comprising:
    achieving, by the AR apparatus, communication with a terminal device;
    receiving, by the AR apparatus, image data from the terminal device, while disenabling a display function of the terminal device;
    determining, by the AR apparatus, whether or not the terminal device has been unlocked; and
    in the case that the terminal device has been unlocked, displaying, by the AR apparatus, the image data,
    wherein the step of determining, by the AR apparatus, whether or not the terminal device has been unlocked comprises:
    capturing, by the AR apparatus, a first image containing a current image displayed on the terminal device;
    comparing, by the AR apparatus, the first image with a pre-stored target image; and
    in the case that the first image matches the target image, determining, by the AR apparatus, that the terminal device has been unlocked,
    wherein the target image contains an image displayed on the terminal device during or after an unlocking operation.

2. The imaging method according to claim 1, wherein the step of displaying, by the AR apparatus, the image data comprises displaying, by the AR apparatus, the image data in accordance with a distance between the AR apparatus and the terminal device and a size of an imaging region of the terminal device, so as to display the image data at the imaging region of the terminal device, wherein the imaging region of the terminal device is located within a contour of the terminal device.

3. The imaging method according to claim 2, wherein the step of displaying, by the AR apparatus, the image data in accordance with the distance between the AR apparatus and the terminal device and the size of the imaging region of the terminal device comprises:
    scaling, by the AR apparatus, the image data in accordance with a proportion of a size of an image currently configured by the AR apparatus to the size of the imaging region of the terminal device;
    adjusting, by the AR apparatus, an imaging distance of the AR apparatus in accordance with the distance between the AR apparatus and the terminal device; and
    displaying, by the AR apparatus, the resultant image data.

4. The imaging method according to claim 3, wherein prior to the step of scaling, by the AR apparatus, the image data, the imaging method further comprises:
    acquiring, by the AR apparatus, two second images of the terminal device from different perspectives;
    determining, by the AR apparatus, vertex coordinates of the imaging region on each of the two second images;
    subjecting, by the AR apparatus, the vertex coordinates to treatment on the basis of a disparity principle, so as to acquire contour coordinates of the imaging region; and
    acquiring, by the AR apparatus, a length and a width of the imaging region in accordance with the contour coordinates.

5. The imaging method according to claim 3, wherein the step of adjusting, by the AR apparatus, the imaging distance of the AR apparatus in accordance with the distance between the AR apparatus and the terminal device comprises subjecting, by the AR apparatus, the acquired image data to treatment so as to acquire a left-eye image and a right-eye image, and adjusting a pixel offset of the left-eye image displayed on a left-eye lens of the AR apparatus and/or a pixel offset of the right-eye image displayed on a right-eye lens of the AR apparatus in accordance with the distance between the AR apparatus and the terminal device.

6. The imaging method according to claim 3, wherein the step of adjusting, by the AR apparatus, the imaging distance of the AR apparatus in accordance with the distance between the AR apparatus and the terminal device comprises subjecting, by the AR apparatus, the acquired image data to treatment so as to acquire a left-eye image and a right-eye image, and adjusting, by the AR apparatus, a distance between each of the left-eye lens and the right-eye lens and a corresponding objective lens of the AR apparatus in accordance with the distance between the AR apparatus and the terminal device.

7. The imaging method according to claim 1, wherein the step of determining, by the AR apparatus, whether or not the terminal device has been unlocked precedes the step of achieving, by the AR apparatus, communication with the terminal device.

8. The imaging method according to claim 1, wherein the step of determining, by the AR apparatus, whether or not the terminal device has been unlocked follows the step of achieving, by the AR apparatus, communication with the terminal device and precedes the step of receiving, by the AR apparatus, the image data from the terminal device.

9. A non-transitory computer-readable storage medium storing therein an instruction, which is operated on an Augmented Reality (AR) apparatus, so as to enable the AR apparatus to implement the imaging method according to claim 1.

10. An imaging method for an Augmented Reality (AR) apparatus, comprising:
   achieving, by a terminal device, communication with the AR apparatus; and
   transmitting, by the terminal device, image data containing a to-be-displayed image generated during the operation of the terminal device to the AR apparatus, such that the AR apparatus displays the image data containing the to-be-displayed image, and disenabling a display function of the terminal device while the AR apparatus displays the image data containing the to-be-displayed image,
   wherein the AR apparatus determines whether or not the terminal device has been unlocked, and in the case that the terminal device has been unlocked, the AR apparatus displays the image data,
   wherein the AR apparatus captures a first image containing a current image displayed on the terminal device, compares the first image with a pre-stored target image; and in the case that the first image matches the target image, determines that the terminal device has been unlocked,
   wherein the target image contains an image displayed on the terminal device during or after an unlocking operation.

11. A terminal device, comprising a memory, a processor and a transceiver connected to each other via a bus, wherein the processor is configured to execute a program stored in the memory, so as to implement the imaging method according to claim 10.

12. A non-transitory computer-readable storage medium storing therein an instruction, which is operated on a terminal device, so as to enable the terminal device to implement the imaging method for the AR apparatus according to claim 10.

13. An Augmented Reality (AR) apparatus, comprising:
   a communication circuit configured to be in communication with a terminal device and receive image data from the terminal device, while disenabling a display function of the terminal device; and
   a display circuit configured to display the image data,
   wherein the AR apparatus further comprises:
   an image capturing circuit configured to capture a first image containing a current image displayed on the terminal device;
   a storage circuit configured to store therein a target image containing an image displayed on the terminal device during or after an unlocking operation; and
   a processing circuit configured to determine whether or not the first image matches the target image,
   wherein in the case that the first image matches the target image, the processing circuit determines that the terminal device has been unlocked,
   wherein the target image contains an image displayed on the terminal device during or after an unlocking operation.

14. The AR apparatus according to claim 13, wherein the processing circuit is further configured to scale the image data in accordance with a proportion of a size of an image currently configured by the AR apparatus to the size of an imaging region of the terminal device, and adjust an imaging distance of the AR apparatus in accordance with a distance between the AR apparatus and the terminal device.

15. The AR apparatus according to claim 13, wherein the image capturing circuit comprises two cameras.

16. The AR apparatus according to claim 13, wherein the image capturing circuit comprises one camera.

* * * * *